United States Patent [19]

Maxemchuk et al.

[11] Patent Number: 4,534,024

[45] Date of Patent: Aug. 6, 1985

[54] SYSTEM AND METHOD FOR CONTROLLING A MULTIPLE ACCESS DATA COMMUNICATIONS SYSTEM INCLUDING BOTH DATA PACKETS AND VOICE PACKETS BEING COMMUNICATED OVER A CABLE TELEVISION SYSTEM

[75] Inventors: Nicholas F. Maxemchuk, Mountainside; Arun N. Netravali, Westfield, both of N.J.

[73] Assignee: AT&T Bell Laboratories, Murray Hill, N.J.

[21] Appl. No.: 446,192

[22] Filed: Dec. 2, 1982

[51] Int. Cl.³ .......................... H04J 3/02; H04J 3/00; H04J 6/00; H04Q 11/04

[52] U.S. Cl. ....................................... 370/85; 370/94; 370/60

[58] Field of Search ...................... 370/85, 86, 89, 94, 370/60, 50, 124; 340/825.05

[56] References Cited

U.S. PATENT DOCUMENTS

| | | | |
|---|---|---|---|
| 3,731,002 | 5/1973 | Pierce | 370/89 |
| 3,851,104 | 11/1977 | Willard et al. | 179/15 BY |
| 3,890,471 | 6/1975 | Hachenburg | 370/89 |
| 3,891,804 | 6/1975 | Hachenburg | 370/86 |
| 4,063,220 | 12/1977 | Metcalfe et al. | 340/147 |
| 4,124,776 | 11/1978 | Nocker | 370/89 |
| 4,205,326 | 5/1980 | Porter et al. | 370/86 |
| 4,292,623 | 9/1981 | Eswaran et al. | 370/85 |
| 4,337,465 | 6/1982 | Spracklen et al. | 370/85 |
| 4,383,315 | 5/1983 | Torng | 340/825.05 |
| 4,420,831 | 12/1983 | Hackett | 370/50 |
| 4,432,088 | 2/1984 | Frankel | 370/85 |

*Primary Examiner*—Douglas W. Olms
*Assistant Examiner*—Wellington Chin
*Attorney, Agent, or Firm*—Richard J. Roddy; Jack S. Cubert

[57] ABSTRACT

The instant communications system and method for controlling both digital voice traffic and digital data traffic includes a communications path, a source station and a destination station. The source and destination stations are respectively adapted to be coupled to a source station home network and to a destination station home network. The source station is further adapted to transmit a signaling packet on a first transmit control channel. The signaling packet is for signaling a destination station that the source station has an information packet intended for the destination station. The destination station is adapted to detect the signaling packet on a second receive control channel. The signaling packet includes a field for identifying the source station which has the information packet intended for the destination station. In response to the signaling packet, the destination station is coupled to the source home network. Thereafter, information packets may be transmitted from the source station on a third control channel and then be translated to a source station home network channel for transmission to the destination station.

20 Claims, 6 Drawing Figures

FIG. 4

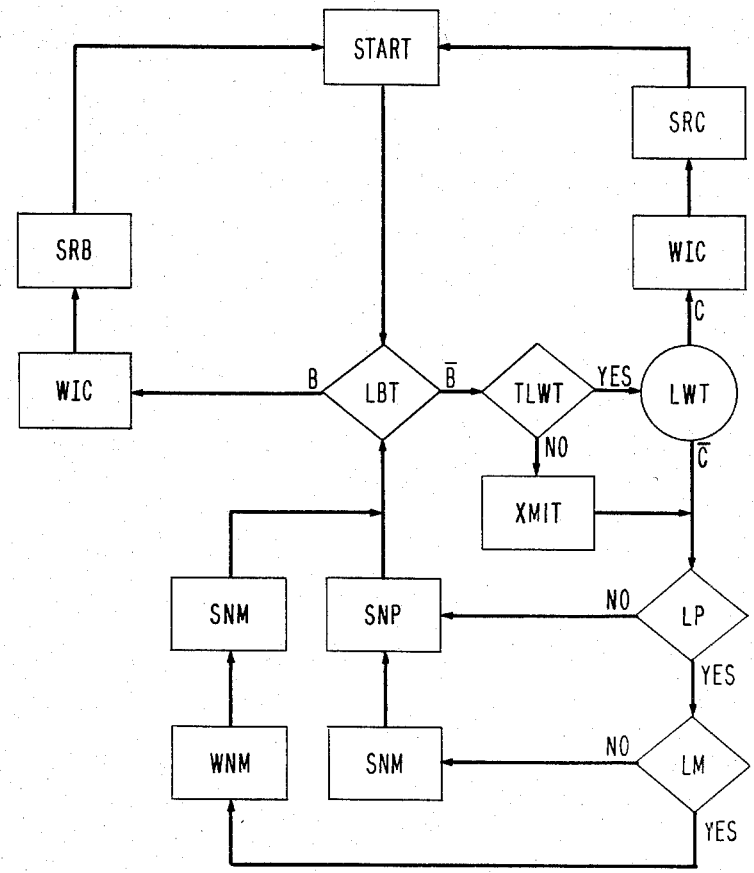

LEGEND:

B - CHANNEL BUSY
    C - COLLISION DURING TRANSMISSION
  LBT - LISTEN TO THE CHANNEL BEFORE TRANSMITTING
   LM - TEST IF THE TRANSMITTED MESSAGE WAS THE LAST MESSAGE IN THE QUEUE
   LP - TEST IF THE TRANSMITTED PACKET WAS THE LAST PACKET IN THE MESSAGE
 LWT - LISTEN TO THE CHANNEL WHILE TRANSMITTING
 SNM - SCHEDULE TRANSMISSION OF NEXT MESSAGE
 SNP - SCHEDULE TRANSMISSION OF NEXT PACKET
 SRB - SCHEDULE A RETRY AFTER A BUSY CHANNEL
 SRC - SCHEDULE A RETRY AFTER A COLLISION
TLWT - TEST IF THIS SOURCE IS TO LISTEN WHILE TRANSMITTING
 WIC - WAIT FOR IDLE CHANNEL
 WNM - WAIT FOR NEXT MESSAGE
 XMIT - TRANSMIT

SYSTEM AND METHOD FOR CONTROLLING A MULTIPLE ACCESS DATA COMMUNICATIONS SYSTEM INCLUDING BOTH DATA PACKETS AND VOICE PACKETS BEING COMMUNICATED OVER A CABLE TELEVISION SYSTEM

TECHNICAL FIELD

This invention relates to communications systems and, more particularly, to a multiple access digital data communications system and method.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals, or stations. For example, U.S. Pat. No. 3,851,104; entitled "Digital Communications System" and issued Nov. 26, 1974; discloses a time division, multiple access communications system which, under the control of a central terminal, allows an interconnection among a plurality of user terminals by way of a single communications signal path.

As the digital computer art advanced, parallel advances in the semiconductor art lead to smaller, relatively inexpensive computers. With the advent of such smaller computers, the technique of central control is being abandoned in favor of a distributed control technique. Also, because of the usually bursty nature of digital computer information, the recent trend has also been toward communications systems having a capability for handling packets of digital information. One such distributed control packet communications system is disclosed in a copending application by N. F. Maxemchuk, entitled "System, Apparatus and Method for Controlling a Multiple Access Data Communications System Including Variable Length Data Packets and Fixed Length Collision-Free Voice Packets", and filed Mar. 15, 1982 as Ser. No. 357,850. Such systems commonly employ Carrier Sense Multiple Access/Collision Detection (CSMA/CD). Indeed, the copending application, inter alia, discloses a communications system in which, when a terminal (or a station or a source) is to start an intended packet transmission on a communications channel, the station listens to signals on the channel before transmitting (LBT). Upon detecting the presence of another transmission on the channel, the terminal delays the intended packet transmission until no other transmissions are sensed, i.e., it waits for an idle channel (WIC) and schedules a retry after detecting the busy channel (SRB). When the intended transmission is started, the terminal thereafter listens to signals on the channel, i.e., it listens while transmitting (LWT). If an interference (or collision) is detected, the transmission is terminated and a random number generator is used to schedule a retry after the collision (SRC) by selecting an interval of time at the completion of which a retransmission of the packet will be attempted.

Unfortunately electrically long CSMA/CD systems may introduce undesirable signal transmission delays.

Further, with the widespread introduction of cable television (CATV) and other relatively wideband systems, alternative uses for such wideband systems may be possible. In that connection, economical alternatives and/or adjuncts to the well known local telephone network are being proposed.

SUMMARY OF THE INVENTION

These and other problems are solved with the instant system and method for controlling both digital voice traffic and digital data traffic in a communications system. The communications system includes a communications path, a source station and a destination station. The source and destination stations are respectively adapted to be coupled to a source station home network and to a destination station home network. The source station is further adapted to transmit a signaling packet on a first transmit control channel. The signaling packet is for signaling a destination station that the source station has an information packet intended for the destination station. The destination station is adapted to detect the signaling packet on a second receive control channel. In response to the signaling packet, the destination station is coupled to the source home network. Thereafter, information packets may be transmitted from the source station on a third control channel and then be translated to a source station home network channel for transmission to the destination station.

BRIEF DESCRIPTION OF THE DRAWING

The invention should become fully apparent when taken in connection with the following detailed description and accompanying drawing in which:

FIG. 4 includes a flow chart useful in describing the principles of the invention, which flow chart can readily be embodied in the system illustrated in FIGS. 1 and 5;

DETAILED DESCRIPTION

Broadly, the instant controlling arrangement includes a protocol (or method) and apparatus (or system) for transmitting signals from one station and for receiving the signals at another station. The signals may be speech signals such as digitized voice signals and/or non-speech signals such as a data signals.

As an adjunct to a local telephone network, the signals to be transmitted may be communicated over a multiple access, wideband medium such as is commonly associated with a cable television (CATV) system. In known CATV systems, there is usually head-end apparatus which includes a transmitter for transmitting television signals in a CATV frequency band $F_{tv}$ through a low pass filter thence over a coaxial cable, the cable having a relatively large bandwidth, e.g., 300–400 megahertz. The signals typically propagate down the cable to be coupled to the respective user stations, e.g., TV sets, and, while so doing, fan out in a tree-like manner over a plurality of branches $b_i$ which comprise the CATV system. See, for example, FIG. 5.

It is well known that electrical signals, depending upon the electromagnetic transmission characteristics of the transmission medium, typically propagate on a communications channel at a speed in the range of 0.6 to 0.9 of the speed of light, the speed of light being estimated to be about 186,000 miles per second. For ease of discussion, the estimated speed of light is translated to an electromagnetic propagation speed of approximately one foot per nanosecond. Accordingly, it should be clear that, as a signal propagates or travels down a communications channel, the transmission medium may be busy at one station, only while the signal is electrically being received at, or, for that matter, transmitted from, the station; otherwise the medium is not busy, or is idle, at least as to that station. Further, the time delay as the signal travels from the one station to another station is commonly called the propagation delay. Hence, if the electrical length of a communications path is relatively long, the propagation delay may be relatively long. To shorten the length of the delay, the path may be sectionalized onto geographic areas, each area having a shorter electrical length. As a result, the propagation delay may be shortened. Another way of sectionalizing the path may be attained through a dividing of the broad frequency spectrum into a plurality of smaller frequency bands. Each smaller band then comprises a part of the frequency spectrum. As a result, it should be clear that the transmission rate of signals in each smaller band would be less than the transmission rate of signals using the entire broad spectrum.

Figure 1:
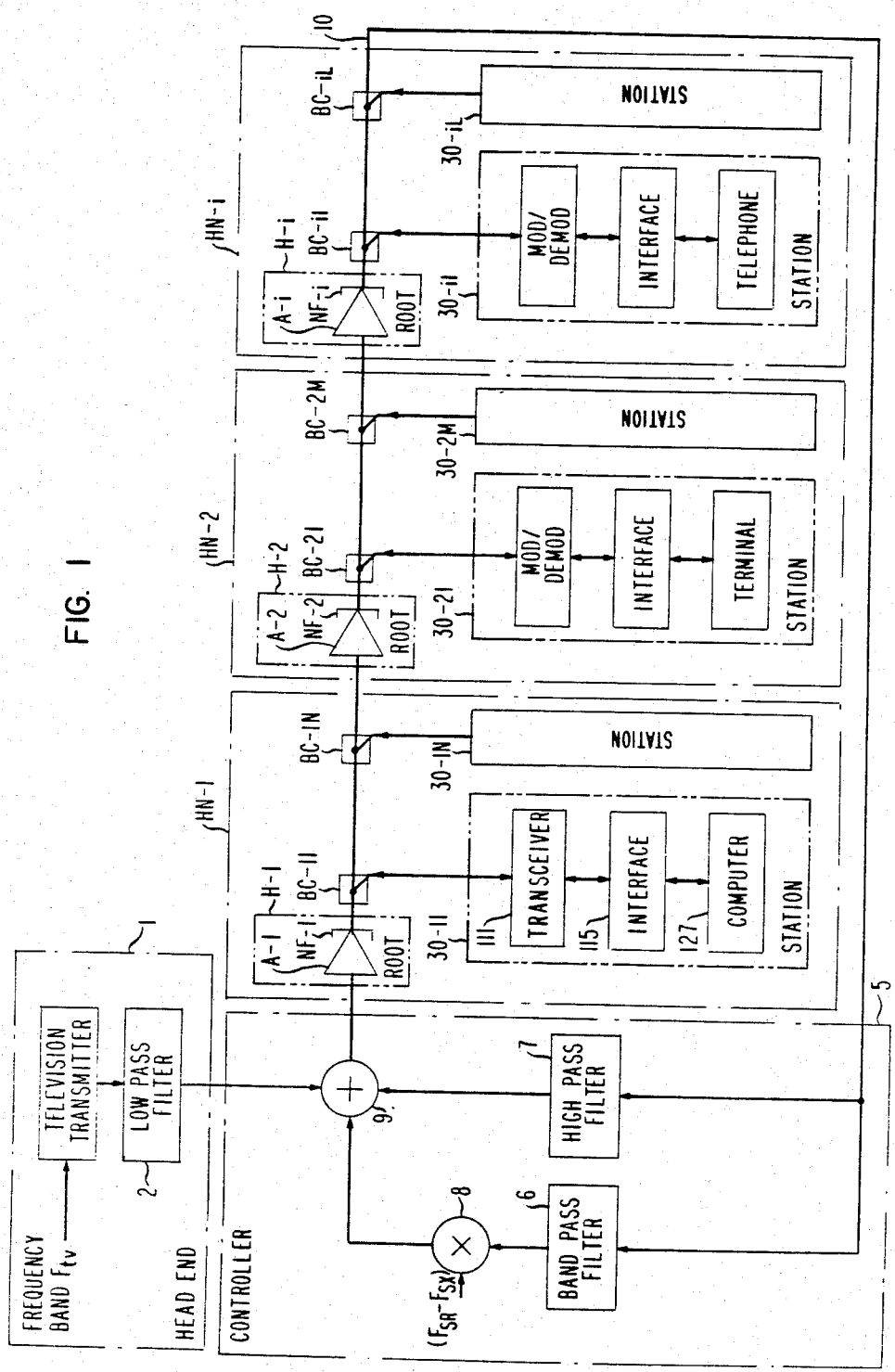
FIG. 1 illustrates a communications system including a plurality of stations (also called terminals or sources or destinations) interconnected by a communications path, which system is useful in describing the principles of the invention.

A sectionalized system may be described through use of the modified CATV system illustrated in FIG. 1 with standard head-end apparatus 1. There the CATV system is geographically sectionalized into areas having shorter electrical lengths (i.e., the electrical length in each section is shorter than the electrical length of the total system). Here, for illustration, each of three sections, which are respectively labeled HN-1, HN-2 and HN-i, is called a home-network, or homenet. Homenet HN-i is then the homenet for those stations in section i and is representative of sections along the CATV system. For example, we assume that exogenous factors can result in a plurality K of stations being economically and efficiently assigned to predetermined respective ones of a plurality P of local networks (or sections), e.g., $n_i$ stations being assigned to the i-th local network (or section) so that $$K = \sum_{i=1}^{P} n_i.$$

Hence, in what follows, we assume that each station is assigned to a section, which we call a "home-network". Also, we assume that identifications of the transmitting and the receiving stations are included in each packet. Further, we assume that each station maintains a list of the home-networks of all other stations with which it may communicate and that each station is adapted to determine the home-network of each such other station.

The general concept of a homenet is more specifically described in a copending application by Z. L. Budrikis-A. N. Netravali, entitled "Method and System for Controlling the Interconnecting of a Plurality of Local Data Networks" and filed Aug. 11, 1982 as Ser. No. 407,145. Here, however, we describe an improvement thereover, which improvement permits the communications of voice and data signals over a CATV system.

To further sectionalize the system, assume the frequency spectrum of the CATV system is divided into predetermined, not necessarily equal, frequency bands, for example, into bands of six megahertz. Each such band forms a telecommunications channel over which signals may be transmitted and/or received. Now, consider three specific ones of the frequency bands. Assume two of the three specific frequency bands are used for control signaling. A first specific control signaling band called $F_{SX}$ is assumed for transmitting control signals. A second specific control signaling band called $F_{SR}$ is assumed for receiving control signals. A third specific band is a nominal packet transmission frequency band $F_o$ for transmitting a packet within a homenet. Nextly, assume each homenet e.g., HN-i, has assigned thereto a predetermined homenet frequency band which we label F-i for homenet HN-i. A use of each homenet frequency F-i will shortly be made more clear.

As an aside, we take some liberty with the phrase "frequency band". In reality what we mean is a band of frequencies, which band has included therein a frequency identified by the label we use for identifying the band.

Return now to FIG. 1 wherein each illustrative homenet HN-i includes one or more stations e.g., 30-i1 through 30-iL each station being coupled to communications path 10 through a corresponding bidirectional coupler e.g., BC-i1 through BC-iL. Path 10 may be embodied, for example, through a conventional high frequency coaxial cable or fiber optic cable or microwave radio link or other medium. Each bidirectional coupler e.g., BC-i1 may, for example, be insertable in path 10 so that signals to and from each respective source, or station, 30-i1 may be coupled to the communications link thereby formed. In particular, on the one hand, coupler BC-i1 is for electrically coupling signals, representing, for example, packets of information, from communications path 10 to station 30-i1. In that manner, station 30-i1 may read (or receive or detect) packets from communications path 10. On the other hand, coupler BC-i1 is also for coupling signals representing, for example, packets of information from station 30-i1 to communications path 10. In that manner, station 30-i1 may write (or transmit or insert) packets on communications path 10.

Station 30-11 may include transceiver 111, interface stage 115, and, as a using device, station equipment 127. In turn, station equipment 127 could include equipment such as a common telephone coupled through analog-to-digital and digital-to-analog converters and functioning as a voice source for providing digitized voice samples and for reconstructing an analog speech waveform from a digital sample. Alternatively, station equipment 127 could include a digital terminal or a digital computer for providing digital data traffic, e.g., home computers interconnected to an existing CATV system in which some of the frequency spectrum is used for local television while some of the frequency spectrum is used as herein described. Also alternatively station equipment 127 could include a digital interface unit, for example, for interconnecting path 10 with one or more other such paths, some of the other paths perhaps being geographically or electrically distant from the instant path. Obviously, still other alternatives will occur to the skilled artworker.

Notwithstanding the foregoing, each coupler BC--; can be a "bidirectional coupler" such as these words are often used in the CATV art. To avoid confusion, we wish to dwell on the words and function of each "bidirectional coupler". Each coupler BC--; can be viewed as comprising a pair of oppositely directed unidirectional couplers. Specifically, and on the one hand, referring to FIG. 1, assume that signals are propagated down path 10 in a generally left to the right direction. Thus, as signals propagate down path 10 to homenet HN-i, the signals may pass through a combination of unidirectional amplifier A-i and notch filter/translator NF-i and thence be received by a respective station of stations 30-i1 through 30-iL of homenet HN-i through a corresponding coupler of BC-i1 through BC-iL. (Hereinafter the combination amplifier-notch filter and translator comprises apparatus located at the "root" of homenet HN-i. Also, as will soon be made more clear, the root apparatus parallels the aforementioned headend apparatus. Hence, the root of homenet HN-i will also be referred to as the "nominal" headend H-i of homenet HN-i.) On the other hand, and referring also to FIG. 4, assume station 30-i1 has an information packet for transmission. The station listens to path 10 before transmitting (LBT). Upon detecting an idle channel, station 30-i1 transmits its packet using the aforesaid third nominal packet transmission frequency band $F_o$. The packet propagates, not in a generally left to right direction, but rather in a direction from station 30-i1 toward the root of homenet HN-i, i.e., toward the combination of amplifier A-i and notch filter/translator NF-i at the nominal headend H-i of homenet HN-i in our illustrative embodiment. Hence, a station receives from the left and also transmits to the left. (A few alternative embodiments are hereinafter described.) However, as priorly described, amplifier A-i is a unidirectional amplifier. Accordingly, the nominal frequency band $F_o$ signal does not propagate through amplifier A-i. Rather, notch filter/translator NF-i at nominal or local headend H-i translates the signal from the nominal frequency band $F_o$ to the source station homenet frequency band F-i and transmits the homenet band signal from the root of the source station homenet HN-i in a generally left to right direction down path 10 toward the electrically next homenet. As the homenet band F-i signal propagates down path 10 it may be coupled through coupler BC-i1 to station 30-i1, as priorly described, as well as be extended to electrically next station(s). Thereby homenet band F-i signal may be received by any station (including the transmitting (or source) station) coupled to path 10.

As an aside, the transmitting station may be adapted for detecting differences, and hence errors, between the transmitted $F_o$ band signal and the received F-i band signal.

Advantageously, since homenet band F-i signals are transmitted only from the root of homenet HN-i, the root may be adapted so that a collision among signals in frequency band F-i can be avoided.

Also, for the presently described illustrative embodiment, it should be clear that, within a homenet, signals may propagate on communications path 10 in both directions and that, as between homenets, signals propagate on communications path 10 in one (left-to-right) direction.

In our illustrative one direction inter-homenet embodiment, the homenet frequency signal F-i propagates down path 10, in our example from the left to the right, and is extended through each electrically subsequent homenet. Eventually, the F-i signal will loop-around, as does path 10, through controller 5 to thereafter reappear at the originating homenet HN-i. (Here high-pass filter 7 permits the F-i signal to pass through controller 5.) Upon detection of the homenet F-i signal at the root of HN-i, notch filter/translator NF-i filters out the looped around F-i signal thereby preventing a recirculating of the F-i signal and also thereby preventing a collision among F-i signals. Of course, since the homenet F-i signal originated at the root of homenet HN-i and since the homenet F-i signal loops-around to the root of homenet HN-i, it can be concluded that the packet, represented by the homenet F-i signal, was received by the destination station. (An alternative embodiment may contemplate an acknowledgement packet being transmitted from the destination station to the source station for acknowledging receipt of the information packet and/or, as hereinafter described, a signaling packet.)

As an aside, the root apparatus of homenet HN-i may be adapted for detecting differences, and hence errors, between the transmitted F-i band signal and the received, loop-around F-i band signal.

The preceding then describes the transmission of an information packet(s) from a source to a destination, the transmission occurring, as mentioned, for each homenet HN-i at the respective a homenet frequency F-i. We now turn to a description of the "call setup" process between the source and the destination. The call setup process contemplates using the aforementioned first and second control signaling bands $F_{SX}$ and $F_{SR}$. The $F_{SX}$ and $F_{SR}$ bands are nextly described in relationship to a station on one homenet HN-i communicating with a station on either the same homenet HN-i or a different homenet e.g. HN-1.

Specifically, and as before, source 30-i1 listens to path 10 before transmitting. Upon detecting an idle $F_o$ channel, source station 30-i1 transmits a signaling packet using the aforesaid third nominal packet transmission frequency band $F_o$. As before, the signaling packet propagates from station 30-i1 toward the root of source station homenet HN-i. Responsive to detecting a signaling packet (rather than an information packet), notch filter/translator NF-i translates the signal from nominal frequency band $F_o$ to the aforementioned first transmit control signal frequency band $F_{SX}$ and transmits the transmit control $F_{SX}$ signal from the root of source station homenet HN-i in a generally left to right direction, as before, toward the electrically next homenet.

The transmit control signal propagates down path 10 and is extended through each electrically subsequent homenet. Eventually, the $F_{SX}$ signal could loop-around to reappear at the originating (or source) homenet. However, here unlike with the aforedescribed information packet, in response to detecting the $F_{SX}$ signal, controller apparatus 5 removes the $F_{SX}$ signal by way of filter 7 and translates the first transmit control band $F_{SX}$ signal to the second receive control signal frequency band $F_{SR}$ by way of filter 6 and frequency shift apparatus 8 and transmits the second receive control signal in a generally left to right direction through mixer 9 down path 10 toward the next electrically subsequent homenet(s). Here for description and not by way of limitation we assume that the CATV headend transmitter frequency band $F_{tv}$ and the other aforementioned signals are related approximately as:

$$F_{tv} < F_{SX} < F_{SR} < F\text{-}i \tag{1}$$

Each station on each homenet is adapted to monitor second receive control band $F_{SR}$. Since the signaling packet (as in hereinafter more particularly described) is assumed to include both a destination address field and a source address field, each station is further adapted to selectively read the respective address fields and to respond thereto.

For example, each station reads the destination address field of each packet in second receive control band $F_{SR}$. Upon detecting its own address in the destination address field, the receiving station adapts to a destination mode. In the destination mode, the receiving station reads the source address field. Recall that each station has a homenet and that each homenet has a homenet frequency band. Therefore, responsive to the source address in the signaling packet, the destination is adapted to be coupled to, and to monitor, the homenet frequency band of the source. Recall that information packets from each source station in homenet HN-i are transmitted in frequency band F-i. Hence with the destination being coupled to the source station homenet for monitoring the source homenet frequency band, the destination station may detect information packets, which packets include an address identifying the destination as the intended destination. Thereafter, the intended destination may read and process the information packet in any predesigned manner.

Also, for example, each source reads the source address field of each packet in second receive control band $F_{SR}$. Upon detecting its own address in the source address field, the source reads the entire signaling packet. If the packet is received in a substantially error free form, it may be concluded that there was, among other things, no collision as to the signaling packet; otherwise a retransmission may be attempted.

Here we note, as an aside, that the destination station may be electrically either before or after the source station. Hence, receipt of the error free signaling packet by the source may not imply that same has been received by the destination. Rather, it does imply that the signaling packet is substantially error free.

Continuing, eventually the second receive control signal $F_{SR}$ will loop-around to reappear at controller 5. Upon detection of the second receive control signal, controller 5 may, through high pass filter 7, filter out the looped-around $F_{SR}$ signal, thereby preventing a recirculating of the $F_{SR}$ signal and also thereby preventing a collision among $F_{SR}$ signals. (See relationship (1) above.)

Thusly, in summary, any station, which is to receive an information packet(s) from a station on homenet HN-i, is adapted to monitor frequency band F-i and, since all packets in band F-i originate of the root of homenet HN-i, the root apparatus can be readily adapted to avoid collisions of signals at band F-i.

Also, since amplifier A-i and notch filter/translator NF-i are at the root of homenet HN-i, the same third nominal frequency $F_o$ can be used in each homenet. Further, collisions as to nominal frequency $F_o$ signals remain localized to the respective homenets and do not cross homenet boundaries.

Still also, any station, which is to receive signaling packets, is adapted to monitor the second receive control frequency band $F_{SR}$. Since all packets in band $F_{SR}$ originate at controller 5, controller 5 can be readily adapted to avoid collisions of signals in band $F_{SR}$.

PACKET FORMATS

Figure 2:
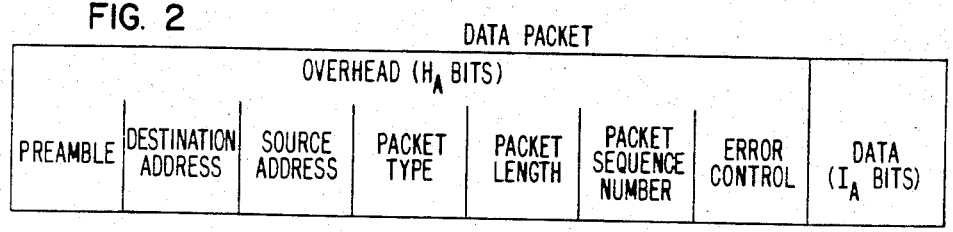
FIG. 2 illustrates a data traffic packet format useful in describing the principles of the invention.

We now turn to a description of an illustrative packet for use in the system depicted in FIG. 1. But for a packet type field, FIG. 2 illustrates the format of a well known, yet illustrative, packet for communicating digitized information. For illustration, the data packet is assumed to include a plurality of fields, each field including one or more bits. Here, a data packet may comprise two primary fields. For example, the packet may comprise an overhead field of $H_A$ bits and a data field of $I_A$ bits. The overhead field may, in turn, include secondary fields such as (i) a preamble field for timing and synchronizing, (ii) a destination station address field for identifying a called station, (iii) a source station address field for identifying a calling station, (iv) a packet type for identifying whether the packet is a signaling packet, a data packet, a voice packet, or still another type(s) packet, (v) a packet length field for identifying the number of data field bits, (vi) a packet sequence number field for identifying where the packet fits in a message having a plurality of packets, (vii) an error control field for checking errors in the packet, and (viii) perhaps other field(s) for identifying other attribute(s). The data field is for inserting the "information" to be transmitted, here shown as including a variable number $I_A$ of bits.

Figure 3:
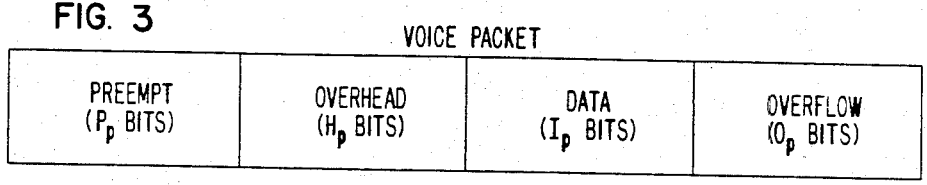
FIG. 3 illustrates a voice traffic packet format useful in describing the principles of the invention.

FIG. 3 depicts a format of an illustrative packet for communicating voice traffic. The voice packet is also assumed to include a plurality of fields, each field also including one or more bits. Here, a voice packet may comprise four primary fields. For example, the packet may comprise a preempt field of $P_p$ bits, an overhead field of $H_p$ bits, a data field of $I_p$ bits, and an overflow field of $O_p$ bits.

During the time interval of a preempt field, a voice source could place a signal on the transmission media but would not send "useful information". The preempt interval would be, timewise, long enough for a transmitting station source to detect a collision, stop transmitting its packet, and have the effects of the transmission removed from the system before the voice source begins transmitting "useful information". The estimated time length of the preempt interval, $\tau_p$, is approximately:

$$\tau_p = 2\tau_t + \tau_{on} + \tau_I + \tau_{off}$$

where $\tau_t$ is the one way propagation delay in the medium, $\tau_{on}$ is the time required for the signal level to become detectable, $\tau_I$ is the time for an interfering signal to be detected, and $\tau_{off}$ is time for a signal that is turned off to stop effecting a receiver. By way of example, the bit length of the preempt field in a three megabit per second, one kilometer channel system could be $(P_p=)$ 38 bits long.

The length of an overhead field for a voice packet will typically be less than the length of an overhead field for a data packet. For example, the overhead field of a data packet may be $(H_A=)100$ bits while the overhead field of a voice packet may be $(H_p=)48$ bits. Reasons for the smaller voice packet overhead field include the following:

(1) Since retransmitted packets can usually be expected to arrive too late to be useful, an error control field may not be necessary for voice sources. Also, it is known that a greater error rate can be tolerated in sampled voice traffic than can be tolerated with data traffic, (2) Since voice packets do not arrive out of sequence, a sequence number field may not be necessary, and (3) Since voice packets are assumed to be fixed or deterministic in length, a packet length field may not be necessary.

As to the data field, when a voice source acquires access to the channel, it transmits in the data field all the data that has accumulated since a last transmission. As in FIG. 4, the source schedules its next packet transmission to occur a predetermined time $T_p$ seconds after the successful transmission of the current packet. If the channel is not busy (i.e., is idle) at the end of the $T_p$ seconds, voice samples accumulated between transmissions can be inserted into the data field and then transmitted as a voice packet. If the channel is busy at the end of the $T_p$ seconds, the station waits for an idle channel (WIC) before transmitting the voice packet. Samples that arrive during the (busy) waiting time can be inserted in the overflow field of the voice packet and transmitted when the channel becomes idle. The size of the overflow field is determinable as a function of the maximum delay a voice source can experience. According to the instant method or protocol, the maximum delay for a voice source fortuitously will not exceed the time for one data packet transmission. In one system, where a voice source may generate 8000 samples per second and where each sample may comprise four bits and where $T_p$ is 30 milliseconds, a maximum of four samples could arrive during a packet transmission interval. Therefore, in that system, the overflow field comprises $(O_p=)16$ bits. On the other hand, even when there are no overflow samples to be transmitted, the source can transmit a "don't care" condition, e.g., signal carrier, during the overflow time. Advantageously a voice source takes no more time to transmit a packet when it is delayed, e.g., because the channel is busy, than it takes when it acquires access to the channel immediately.

Finally, as to a signaling packet, the packet format could comprise an overhead field including preamble field, destination address field, source address field and packet type field, the latter for identifying the packet as a signaling packet. Other field(s) may be included but are typically extraneous for a signaling packet.

A FEW ALTERNATIVE EMBODIMENTS

Alternative embodiments of the principles of our invention may come to the mind of the skilled art worker. For example, rather than path 10 being a looped around path as is illustrated in FIG. 1, the communications path may take on a treelike structure such as that illustrated in FIG. 5. Accordingly, a signal transmitted from a headend may not loop around to be received at the headend. Indeed, FIG. 5 may be more representative of an existing CATV system than is FIG. 1. In any case, the simple tree network in FIG. 5 includes four homenets, respectively, labeled HN-1, HN-2, HN-i, and HN-4. The headend of the CATV system is labelled e.g., H-i, and each homenet has a nominal headend H-i which headend parallels the priorly described "root." (Note that for simplicity of discussion and not by way of limitation the nominal headend H-1 of homenet HN-1 is here merged into CATV headend H-1.) Stations are connected along the branches of the network with the various branches e.g., $b_i$, respectively extending from various nodes N-j. Hence, the branches of FIG. 5 parallel path 10 of FIG. 1.

In this alternative embodiment we assume that the plurality of frequency bands may be split at a "midsplit frequency" into a first group of frequency bands for transmitting toward the root of a homenet and into a second group of frequency bands for transmitting from the root of the homenet. In this alternative, stations receive signals from a "nominal headend" and transmit signals toward the nominal headend. Hence an objective of the present frequency assignment strategy is to make each homenet frequency e.g., F-i, appear to be emanating from the nominal headend e.g., H-i, of its homenet HN-i and, in that sense, homenet frequency F-i appears to emanate on a tree with its root at the nominal headend. Also the signal propagates down each branch $b_i$ of a tree in a direction away from the headend of the CATV system.

As in the priorly described illustrative embodiment, the nominal headend e.g., H-i, of homenet HN-i is a point at which signals are translated from the nominal frequency $F_o$ to the homenet frequency F-i. That is, in each homenet, stations transmit signals in frequency band $F_o$ toward nominal headend e.g., H-i. At H-i, the $F_o$ signal is translated to the homenet frequency band F-i. Also, and unlike our priorly described illustrative embodiment, the packet in the $F_o$ signal is transmitted from homenet HN-i to headend H-1 of the CATV system over an arrangement partially but not completely illustrated in FIG. 5. At H-1, the packet signal from H-i may also be translated to homenet frequency band F-i and transmitted in band F-i from headend H-1 of homenet HN-1 over the plurality of branches e.g., $b_i$ shown in FIG. 5. Eventually the F-i signal may be received at headend H-i. (This parallels the homenet signals looping around in FIG. 1) As before, a notch filter at headend H-i prevents the F-i signal as received by homenet HN-i from interfering with signals inserted in the F-i band by apparatus at nominal headend H-i. Also at nominal headend H-i of homenet HN-i, notch filter NF-i prevents the $F_o$ signal from being transmitted to another homenet (except as mentioned to headend H-1 of homenet HN-1). Therefore, as before, the $F_o$ band can be used as the nominal transmit frequency in every homenet.

Figure 5:
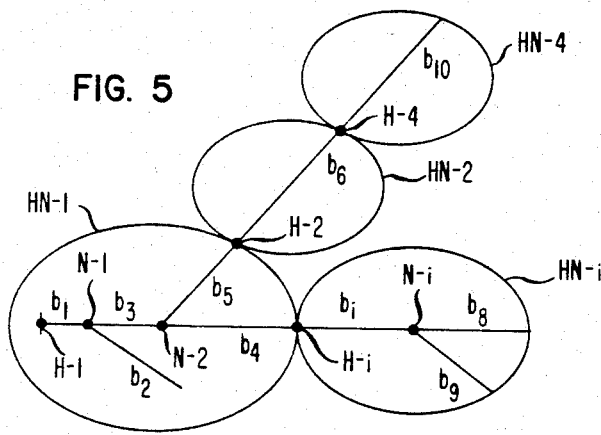
FIG. 5 illustrates the treelike structure of a known CATV system and is useful in describing an alternative embodiment of the principles of the invention.

Now, we describe an arrangement, which is partially but not completely illustrated in FIG. 5, for transmitting the $F_o$ signal from homenet HN-i to headend H-1 of the CATV system. On the one hand as to a connection between H-i and H-1 assume for example, that each homenet has a second homenet frequency F'-i (F prime dash i). Then the F'-i frequency can be used for the connection. In this event, the $F_o$ signal can be transmitted from the station to the nominal headend H-i. As before, the nominal headend H-i can translate the $F_o$ signal to the first homenet frequency F-i and transmit the F-i signal from the nominal headend H-i through homenet HN-i. However, unlike before, the nominal headend H-i can also translate the $F_o$ signal (or the F-i signal) to the second homenet frequency F'-i and transmit the F'-i signal also from nominal headend H-i however, this time, toward CATV headend H-1, e.g. in a direction opposite to the direction of transmission of the first homenet F-i signal. The second F'-i frequency signal can be received at CATV headend H-1 and there be translated to first homenet frequency F-i and be transmitted from headend H-1. On the other hand, if a second homenet frequency band is not so available, a point-to-point connection using a single wire or microwave link or other transmission medium can be used for the connection. In this event, the first homenet frequency F-i can be transmitted from the nominal headend H-i over the point-to-point connection to CATV headend H-1 and be transmitted from headend H-1.

Thus, on the one hand, all stations on a network tree which tree graphically emanates from nominal headend e.g., H-i, of homenet HN-i receive signals in first homenet band F-i which F-i signals are transmitted from H-i. On the other hand, all other stations in the system receive signals in homenet band F-i which F-i signals are transmitted from H-1 (rather than H-i). Therefore any station in the system can receive a packet from any other station in the system only if the destination station is adapted to determine the homenet of the source station and to receive the source homenet frequency.

In the just described alternative embodiment, we assumed that the second homenet frequency band F'-i is below the midsplit frequency. Hence, amplifiers may be inserted in the branches in order to transmit the second F'-i signal toward headend H-1. Further, we assume that the first homenet frequency F-i is above the midsplit frequency. Hence, amplifiers may be inserted in the branches in order to transmit the first F-i signal away from headend H-1.

To even further illustrate this alternative embodiment, we describe a specific example. In FIG. 5, consider a station on homenet HN-2 that wants to transmit, i.e., has a packet to be transmitted to another station. The station inserts the packet in frequency band $F_o$ and transmits the $F_o$ band signal toward the root H-2 of the tree. A notch filter at headend H-4 prevents the $F_o$ signal from being received by stations in homenet HN-4. At headend H-2, the $F_o$ signal is translated to homenet frequency band F-2, which F-2 signal is transmitted from headend H-2 over branch $b_6$ toward homenet HN-4. The F-2 signal can be received by stations on homenet HN-2 as well as on homenet HN-4.

Figure 6:
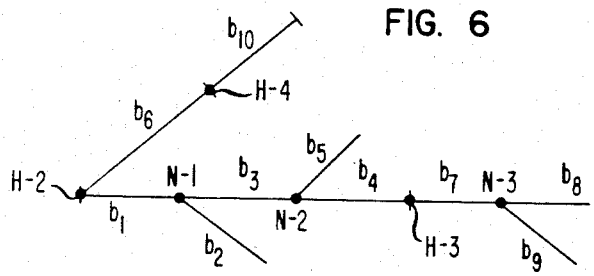
FIG. 6 illustrates the structure of FIG. 5 from the point of view of root, or nominal headend, H-2 and is useful in describing an alternative embodiment of the principles of the invention.

Now as to the arrangement, which is partially but not completely illustrated in FIG. 5, the packet signal can be transmitted from headend H-2 to headend H-1 (a) either in one of the frequencies below the midsplit frequency, e.g. second frequency F'-2, (b) or on a point-to-point connection. At headend H-1, the packet signal can be translated to, if necessary, and transmitted in frequency band F-2 over branch b etc. Stations on homenets HN-1 and HN-3 can therefore receive the F-2 signal. A notch filter at headend H-2 prevents the F-2 signal from being reinserted in homenets HN-2 and HN-4. In effect, by inserting a branch (i.e., the partially but not completely shown connection) in the network from H-2 to H-1 and by breaking the network at H-2, frequency band F-2 "sees" the treelike structure illustrated in FIG. 6 with H-2 as the root of the treelike structure. In a similar manner, paths can be broken so that the frequency band for each homenet "sees" a tree that is rooted at the nominal headend of the transmitting homenet. In each such tree, signals propagate on each branch in the same direction as signals in the original tree.

Further as to this alternative embodiment, the signaling channel, which is used for call setup comprises two frequency bands. Terminals transmit in first control frequency band $F_{SX}$, which is below the midsplit frequency, and receive in second control frequency band $F_{SR}$, which is above the midsplit frequency. At H-1 the signal in $F_{SX}$ is translated to $F_{SR}$ and transmitted therefrom. Hence, stations only transmit in frequency bands $F_o$ and $F_{SX}$. Signals in the other frequency bands are inserted at the respective nominal headends H-i of the respective homenets HN-i.

The station transmission bands $F_o$ and $F_{SX}$ can be made wider than the other frequency bands and could have relatively wide guard bands between the bands. This would make it possible to build a less complex transmitter, for example, one with less stringent filtering requirements. The nominal headends could regenerate signals to a more bandwidth efficient format. It may also be possible to completely eliminate the band $F_{SX}$. Further, since the signaling channel would typically contain only data traffic, the traffic on the signaling channel could be stored and forwarded as in a message or packet switched system.

Another alternative embodiment may relate to the first transmitter control frequency band $F_{SX}$. As described, a control signaling packet may be transmitted in the third nominal band $F_o$ from a source station to a root or nominal headend. The root may translate the signal to band $F_{SX}$. In such an embodiment, the root includes an arrangement for detecting a signaling packet, e.g. responsive to the contents of the packet type field, and for translating frequencies from $F_o$ to $F_{SX}$, and for retransmitting the signaling packet in band $F_{SX}$. In this alternative, each station may be adapted to transmit the signaling packet both down path 10 in a generally left to right direction and in the first transmitter control frequency band $F_{SX}$. Thus, rather than transmit the signaling packet in third nominal band $F_o$, and rather than have the signaling packet retransmitted from the root in band $F_{SX}$, the detecting and translating and retransmitting arrangement may be removed from the root and a signaling packet transmit arrangement may be included in the station.

Still other alternative embodiments of the principles of our invention will be clear to those skilled in the art. Hence, although the principles of our invention have been described and illustrated in detail, it is to be understood that the same is not by way of limitation. The spirit and scope of our invention is limited only by the terms of the appended claims.

What is claimed is:

1. A communication system, said system including a communications path having a headend and at least one branch, a plurality of stations along said communication path which stations are grouped into home networks, at least two of said stations being adapted to be coupled to said communication path, and CHARACTERIZED IN THAT said communication path including a plurality of first and second type signaling channels and at least one channel assigned to each home network;

said at least two stations including a source station and a destination station;

said source station being adapted to transmit a signaling packet on a first type communication path signaling channel to the headend of said communication path and therefrom to said home networks on a second type signaling channel, said signaling packet for signaling said destination station that said source station has at least one information packet for said destination station;
said destination station being adapted to determine the home network of said source station in response to said signaling packet;
at said destination station, means for determining the home network of said source station; and
means for coupling a destination station receiver to the channel assigned to said source station home network.

2. The system defined in claim 1 further comprising:
means for detecting the busy/idle status of a first type signaling channel, and
means responsive to said first type signaling channel being detected as busy for waiting for said first type signaling channel to become idle.

3. The system defined in claim 1 further comprising:
means for detecting the busy/idle status of a first type signaling channel, and
means responsive to said first type signaling channel being detected as idle for transmitting said signaling packet on said first type signaling channel.

4. The system defined in claim 3 further comprising:
means at said communication path headend for detecting a signaling packet on said first type signaling channel;
means for translating said signaling packet from said first type signaling channel to said second type signaling channel; and
means for transmitting said translated signaling packet on said second type signaling channel.

5. The system defined in claim 4 further comprising:
at said destination station, means for detecting a signaling packet on said second type signaling channel which signaling packet includes a destination address for identifying said destination station as the intended destination of a packet transmission.

6. The system defined in claim 5 wherein said source station home network determining means comprises:
at said destination station, means responsive to said signaling packet identifying said destination station as the destination of said intended packet transmission for identifying said source station, and
means responsive to said source identification for determining the home network of said source station.

7. The system defined in claim 1 wherein:
said communication path further comprises a local channel for each home network; and
said system further comprises:
at said source station, means for detecting the busy/idle status of its home network local channel and
means, responsive to said home network local channel being detected as busy, for waiting for said home network local channel to become idle.

8. The system defined in claim 1 further comprising:
at said source station, means for detecting the busy/idle status of its home network local channel, and
means responsive to said home network local channel being detected as idle for transmitting said at least one information packet on said home network local channel.

9. The system defined in claim 8 further comprising:
root apparatus at said source station home network including means for detecting said at least one information packet on said home network local channel, means for translating said at least one information packet from said home network local channel to said source station home network assigned channel, and
means for transmitting said translated packet on said source station home network assigned channel.

10. The system defined in claim 9 further comprising:
at said destination station, means for detecting said at least one information packet on said source station home network assigned channel which information packet includes a destination address for identifying said destination station as the destination of said packet transmission.

11. A method for controlling digital signals in a communication system, said system including a communications path having a headend and at least one branch, a plurality of stations which stations are grouped into home networks, at least two of said stations being adapted to be coupled to said path,
said path including a plurality of first and second type signaling channels and a channel assigned to each home network;
said at least two stations including a source station and a destination station;
said source station being adapted to transmit a signaling packet on a first type signaling channel to the headend of said communication path and therefrom on a second type signaling channel to said home networks, said signaling packet for signaling said destination station that said source station has an information packet for said destination station,
said destination station being adapted to determine the home network of said source station in response to said signaling packet;
said method comprising the steps of
at said destination station, determining the home network of said source station and
coupling a destination station receiver to the channel assigned to said source home network.

12. The method defined in claim 11 further comprising the steps of:
detecting the busy/idle status of a first type signaling channel, and
responsive to said first type signaling channel being detected as busy, waiting for said first type signaling channel to become idle.

13. The method defined in claim 11 further comprising the steps of:
detecting the busy/idle status of a first type signaling channel, and
responsive to said first type signaling channel being detected as idle, transmitting said signaling packet on said first type signaling channel.

14. The method defined in claim 13 further comprising the steps of:
at said communication path headend, detecting a signaling packet on said first type signaling channel;
translating said signaling packet from said first type signaling channel to said second type signaling channel; and
transmitting said translated signaling packet on said second type signaling channel.

15. The method defined in claim 14 further comprising the step of:
at said destination station, detecting a signaling packet on said second type signaling channel which signaling packet includes a destination address for identifying said destination station as the intended destination of a packet transmission.

16. The method defined in claim 15 wherein said source station home network determining step comprises the steps of:
   at said destination station, responsive to said signaling packet identifying said destination station as the destination of said intended packet transmission, identifying said source station, and
   responsive to said source identification, determining the home network of said source station.

17. The method defined in claim 11 wherein:
   said communication path further comprises a local channel for each home network; and
   said method further comprises the steps of:
   at said source station, detecting the busy/idle status of its home network local channel, and
   responsive to said home network local channel being detected as busy, waiting for said home network local channel to become idle.

18. The method defined in claim 11 wherein:
   said communication path further comprises a local channel for each home network; and
   at said source station, detecting the busy/idle status of its home network local channel, and
   responsive to said home network local channel being detected as idle, transmitting said at least one information packet on said home network local channel.

19. The method defined in claim 18 further comprising the steps of:
   at root apparatus of said source station home network, detecting said at least one information packet on said home network local channel, and
   translating said at least one information packet from said home network local channel to said source station home network assigned channel, and
   transmitting said translated packet on said source station home network assigned channel.

20. The method defined in claim 19 further comprising the step of:
   at said destination station, detecting said at least one information packet on said source station home network assigned channel which information packet includes a destination address for identifying said destination station as the destination of said packet transmission.

* * * * *

UNITED STATES PATENT AND TRADEMARK OFFICE
CERTIFICATE OF CORRECTION

PATENT NO. : 4,534,024

DATED : August 6, 1985

INVENTOR(S) : Nicholas F. Maxemchuk and Arun N. Netravali

It is certified that error appears in the above-identified patent and that said Letters Patent is hereby corrected as shown below:

Column 5, line 8, "BC--;" should read --BC--;
line 12, "BC--;" should read --BC--.

Signed and Sealed this

Seventh Day of January 1986

[SEAL]

Attest:

Attesting Officer

DONALD J. QUIGG

Commissioner of Patents and Trademarks